United States Patent [19]
Appleberry

[11] Patent Number: 5,237,887
[45] Date of Patent: Aug. 24, 1993

[54] STRAIGHT LINE MECHANISM

[75] Inventor: Walter T. Appleberry, Long Beach, Calif.

[73] Assignee: Rockwell International Corporation, Seal Beach, Calif.

[21] Appl. No.: 902,514

[22] Filed: Jun. 22, 1992

Related U.S. Application Data

[63] Continuation of Ser. No. 724,051, Jul. 1, 1991, abandoned.

[51] Int. Cl.⁵ ............................................ B25J 18/00
[52] U.S. Cl. .................................. 74/479 BP; 74/103; 74/469; 901/28
[58] Field of Search ............. 74/103, 105, 469, 471 R, 74/471 XY, 479, 480 R, 479 R, 479 BP, 479 P, 479 PF; 901/28

[56] References Cited

U.S. PATENT DOCUMENTS

| | | | |
|---|---|---|---|
| 2,198,635 | 4/1940 | Rossman | 74/103 |
| 2,338,533 | 1/1944 | Pash | 74/103 |
| 2,506,151 | 5/1950 | Hoven et al. | 74/103 |
| 2,569,354 | 9/1951 | Tracy | 74/103 |
| 4,248,103 | 2/1981 | Halsall | 74/469 X |
| 4,651,589 | 3/1987 | Lambert | 74/469 |

Primary Examiner—Allan D. Herrmann
Assistant Examiner—William O. Trousdell
Attorney, Agent, or Firm—Lawrence N. Ginsberg; Charles T. Silberberg

[57] ABSTRACT

The apparatus includes a static base, a platform, a first arm assembly, and a second arm assembly. The first arm assembly has a first terminal portion pivotally connected at a first pivot point to a first portion of the static base and a second terminal portion pivotally connected to the platform at a second pivot point. The first arm assembly is so constructed to permit changes in the distance between the first and second pivot points, but is concomitantly constrained to movement in a desired first plane. The second arm assembly has a respective first terminal portion pivotally connected at a third pivot point to a second portion of the static base and a respective second terminal portion pivotally connected to the platform at a fourth pivot point. The second arm assembly is so constructed to permit changes in the distance between the third and fourth pivot points but is constrained to movement in a desired second plane which is angularly disposed from the first plane. The motion of the platform is constrained to a straight line when the distance between the first and second pivot points and/or the distance between the third and fourth pivot points is changed. The straight line has a direction parallel to an imaginary line defined by the intersection of the first and second planes.

9 Claims, 4 Drawing Sheets

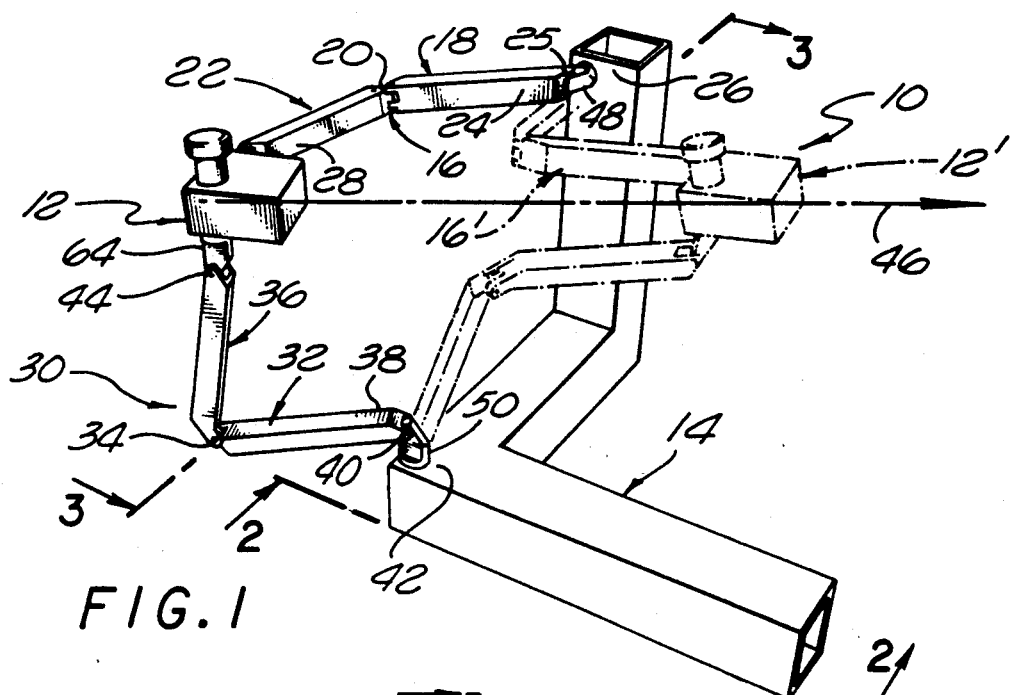
FIG. 1
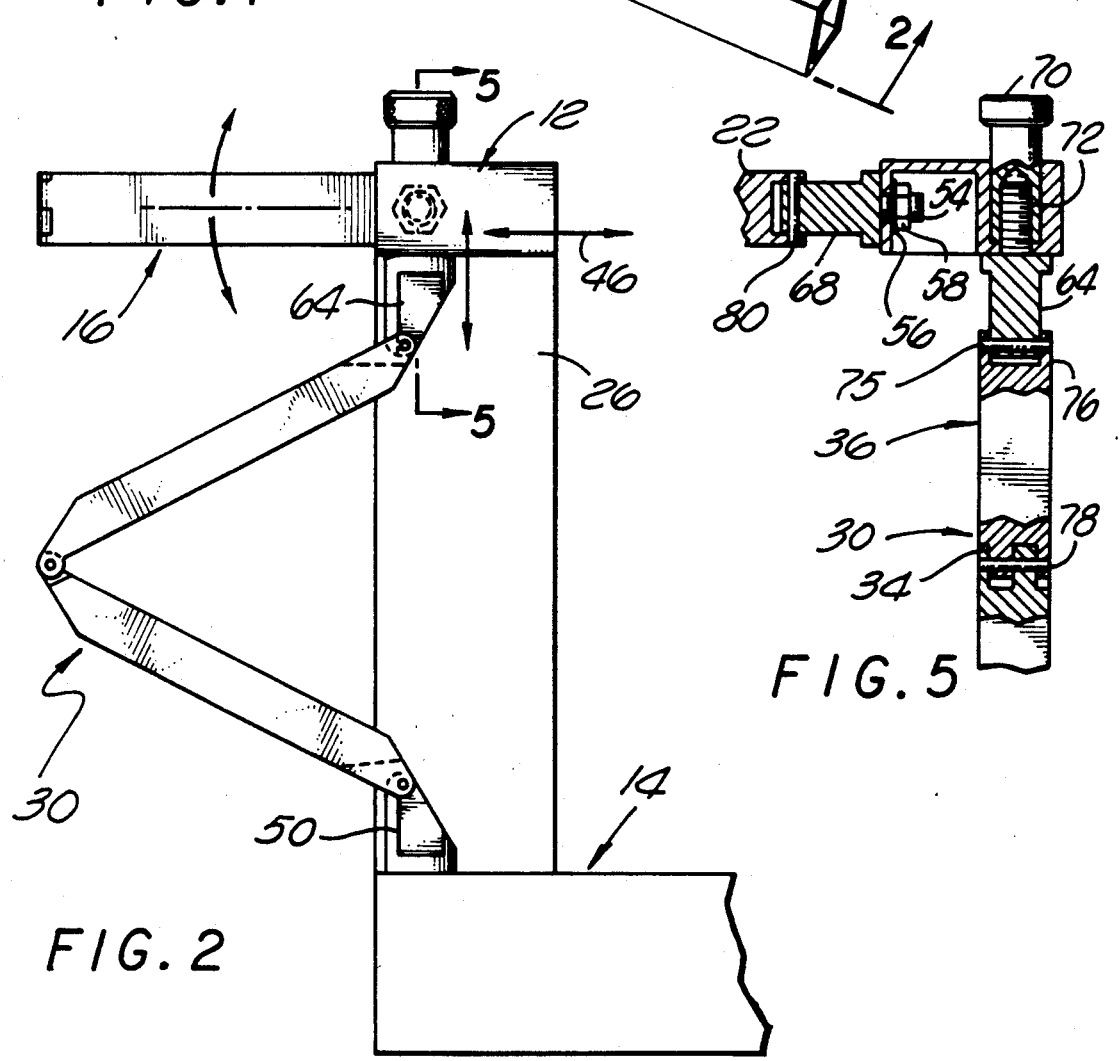
FIG. 2
FIG. 5

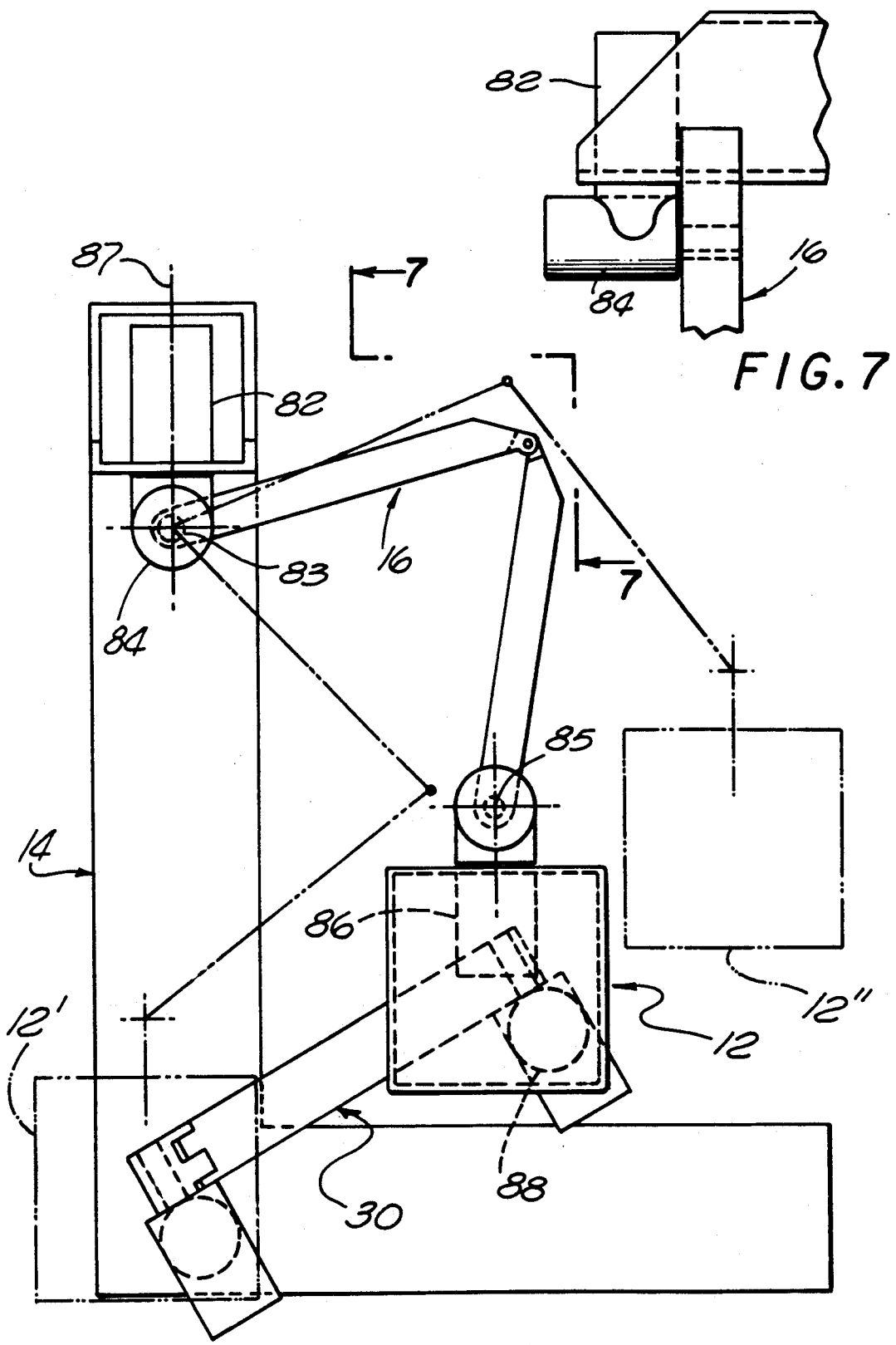

STRAIGHT LINE MECHANISM

This is a continuation of copending application Ser. No. 07/724,051 filed on Jul. 1, 1991, now abandoned.

BACKGROUND OF THE INVENTION

1. Field of the Invention

This invention relates to linkage mechanisms and more particularly to a mechanism for maintaining straight line motion of a platform relative to a base which is static relative thereto.

2. Description of the Related Art

Straight line mechanisms form an important class of devices used for a multitude of industrial applications. One subclass of straight line mechanisms is characterized by pivoting links (occasionally compromised by a sliding element) with the ultimate goal being exact straight line motion. With one notable exception, the Peaucellier linkage, those using only pivoting links produce only straight line approximations.

The Peaucellier mechanism is described in "Mechanisms, Linkages, and Mechanical Controls", edited by Nicholas P. Chironis, published by McGraw-Hill, Inc. 1965; and "Ingenious Mechanisms For Designers and Inventors", Vols. I and II, edited by Franklin D. Jones, The Industrial Press, 1935. It consists of eight links (including a base link), operates in a single plane, and maintains the direction of motion in a fixed and unchangeable manner.

U.S. Pat. No. 4,248,103, entitled "Straight Line Mechanism," issued to J. R. Halsall, discloses a linkage mechanism for an industrial manipulator comprising at least two straight line mechanisms arranged such that a movement in a plane of a geometric point on the linkage mechanism is affected by or affects a coordinated rotary movement of the rotatable members of the straight line mechanisms, the perimeter of the plane being determined by the straight lines, or by lines parallel thereto, along which the straight-line movement of the straight line mechanism occurs.

This mechanism requires both a sliding pair and pivoting links, including a crank, in order to produce straight line motion. Sliding pairs are a source of friction, and are relatively heavy and costly.

U.S. Pat. No. 4,651,589, entitled "Polyarticulated Retractile Mechanism", issued to M. Lambert, discloses a mechanism formed of two end-most pieces, one of which is a reference connected together by at least three legs situated in separate planes and formed from two parts, each associated, on the one hand, with the other part forming the same leg by a spherical connection and, on the other hand, with an end-most piece different from the one with which this other part is associated by means of a rotoid connection.

In the several embodiments of the Lambert invention, consisting of eight triangular links (two end panels, each with three legs, with leg sets attached to each other at three ball type swivel joints), straight line motion is not possible without coordinated manual or remote rotation of at least three independently pivotable joints connecting one end to its three legs. These three pivots each run the full length of the mated triangles. Movement of any one of the three pivots causes the end panel to tilt about an axis passing through the center of two of the three swivels. Thus, the Lambert device does not provide closed loop pivoting of links for constraining any points or points to straight line motion.

U.S. Pat. No. 4,806,068, entitled "Rotary Linear Actuator for Use in Robotic Manipulators", issued to D. Kohli et al, discloses a robotic manipulator for supporting a tool or workpiece, the manipulator including at least one rotary linear actuator adapted to be used by a base and providing for controlled movement of a manipulator link with two degrees of freedom. The robotic manipulator includes a link assembly having one end spherically joined to a movable member for supporting the movable member, the movable member being adapted to support a tool or workpiece. The link assembly is articulated, and the opposite end of the link assembly is supported by a rotary linear actuator for linear movement in a direction transverse to a longitudinal axis of the opposite end of the link assembly and for rotational movement about the axis defined by that linear movement.

Straight line motion of the Kohli et al platform is possible, but only by coordinated rotary motion of the three independent actuators. This coordination is not provided by a closed loop linkage and, therefore, a controller, such as a computer driven system of actuator sensors (including angular displacement, velocity, acceleration, etc.) must be added. Also, straight line motion of the platform, in a direction other than vertical, would be an extremely difficult task for the control system.

OBJECTS AND SUMMARY OF THE INVENTION

It is a principal object of the present invention, therefore, to produce exact straight line motion of a platform relative to a static base.

It is another object to provide a straight line mechanism which is low in cost and is lightweight.

Another object is to provide straight line motion of a platform by means of pivoting links.

Yet another object of the present invention is to provide adjustments in the direction of the straight line in which the platform travels.

Still another object of the present invention is to provide remote means for changing the direction of the straight line and for providing remote means for travel of the platform along the straight line.

These and other objects are achieved by the present invention which maintains motion of a platform in a straight line. The apparatus includes a static base, a platform, a first arm assembly, and a second arm assembly. The first arm assembly has a first terminal portion pivotally connected at a first pivot point to a first portion of the static base and a second terminal portion pivotally connected to the platform at a second pivot point. The first arm assembly is so constructed to permit changes in the distance between the first and second pivot points, but is concomitantly constrained to movement in a desired first plane. The second arm assembly has a respective first terminal portion pivotally connected at a third pivot point to a second portion of the static base and a respective second terminal portion pivotally connected to the platform at a fourth pivot point. The second arm assembly is so constructed to permit changes in the distance between the third and fourth pivot points but is constrained to movement in a desired second plane which is angularly disposed from the first plane. The motion of the platform is constrained to a straight line when the distance between the first and second pivot points and/or the distance between the third and fourth pivot points is changed. The straight line has a direction parallel to an imaginary line defined by the intersection of the first and second planes.

In one embodiment each arm assembly comprises an elbow assembly having a first arm pivotally connected to a second arm. Thus, as opposed to the Peaucellier device, six pivoting links are utilized as opposed to the eight links required by the Peaucellier device. Furthermore, with the Peaucellier device, the direction of the straight line cannot be changed.

In a second embodiment, each arm assembly comprises a first tube telescopically engaged in a second tube. The first and second tubes are keyed against relative rotation therebetween.

The present invention obtains one degree of linear freedom with zero degrees of angular freedom. The embodiment utilizing the elbow assembly obviates the need for tracks, guides, rollers, etc. The present invention is simple, light, and low in cost. Furthermore, unlike, for example, the Halsall or Peaucellier devices, the straight line of the present invention can be changed by either manual or remote means. Additionally, unlike many complicated straight line approximation mechanisms with a multitude of moving parts, the present invention produces exact straight line motion.

Other objects, advantages and novel features of the present invention will become apparent from the following Detailed Description of the Invention when considered in conjunction with the accompanying drawings.

BRIEF DESCRIPTION OF THE DRAWINGS

FIG. 1 is a perspective view of an apparatus for maintaining motion of a platform in a straight line according to the invention.

FIG. 2 is a side elevation view of the apparatus, shown along line 2—2 of FIG. 1.

FIG. 5 illustrates an example of a platform connection, in partial cross-section.

FIG. 6 illustrates the use of rotary actuators for changing the straight line direction and for providing platform translation.

FIG. 7 is a view taken along line 7—7 of FIG. 6.

The same elements or parts throughout the figures of the drawings are designated by the same reference characters, while equivalent elements bear a prime designation.

DETAILED DESCRIPTION OF THE PREFERRED EMBODIMENTS

Figure 4:
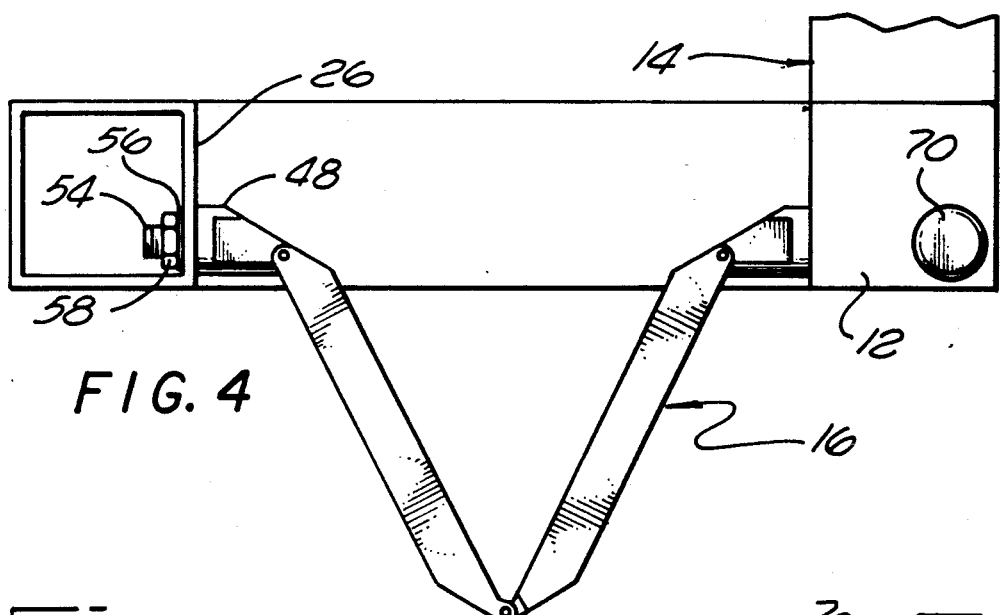
FIG. 4 is a top view of the apparatus, shown along line 4—4 of FIG. 3.

Referring to the drawings and characters of reference marked thereon, FIG. 1 illustrates a preferred embodiment of the apparatus of the present invention, designated generally as 10. It is desired to maintain the motion of a platform 12 in a straight line relative to a base 14. The base 14 remains static relative to the platform 12. A first arm assembly or elbow assembly 16 includes a first arm 18 pivotally connected by an elbow hinge 20 to a second arm 22. The first arm 18 is pivotally connected (i.e. pivot point 25) at a first terminal portion 24 to a first portion 26 of the static base 14. The second arm 22 is pivotally connected at a second pivot point (hidden from view in FIG. 1) at a second terminal portion 28 to the platform 12. The elbow assembly 16 is constrained to movement in a desired first plane, as will be explained in more detail below.

A second elbow assembly, designated generally as 30, similarly includes a first arm 32 pivotally connected at an elbow hinge 34 to a second arm 36. A first terminal portion 38 of the first arm 32 is pivotally connected at a third pivot point 40 to a second portion 42 of the static base 14.

The second arm 36 of the second arm assembly 30 is pivotally connected at a fourth pivot point 44 to the platform 12. The second arm assembly 30 is constrained to movement in a second desired plane which is angularly disposed from the first plane. Thus, the motion of the platform 12 is constrained to a straight line 46 having a direction parallel to an imaginary line defined by the intersection of the first and second planes. Movement along straight line 46 to a second position is illustrated by the phantom lines indicated by prime numeral designations.

FIG. 2 illustrates the platform located at an intermediate position along imaginary line between the positions shown in FIG. 1. (In this elevational view, the platform happens to be directly coincident with the vertical member of the static base 14 which includes the first portion 26 of that base.)

It is emphasized that the present invention is not constrained to the particular straight line 46 illustrated in FIGS. 1 and 2. Rotatable members 48,50 are incorporated with the static base 14 to affix the first elbow (or arm) assembly 16 and second elbow (or arm) assembly 30 in the desired fixed angular orientation for a specific straight line.

Figure 3:
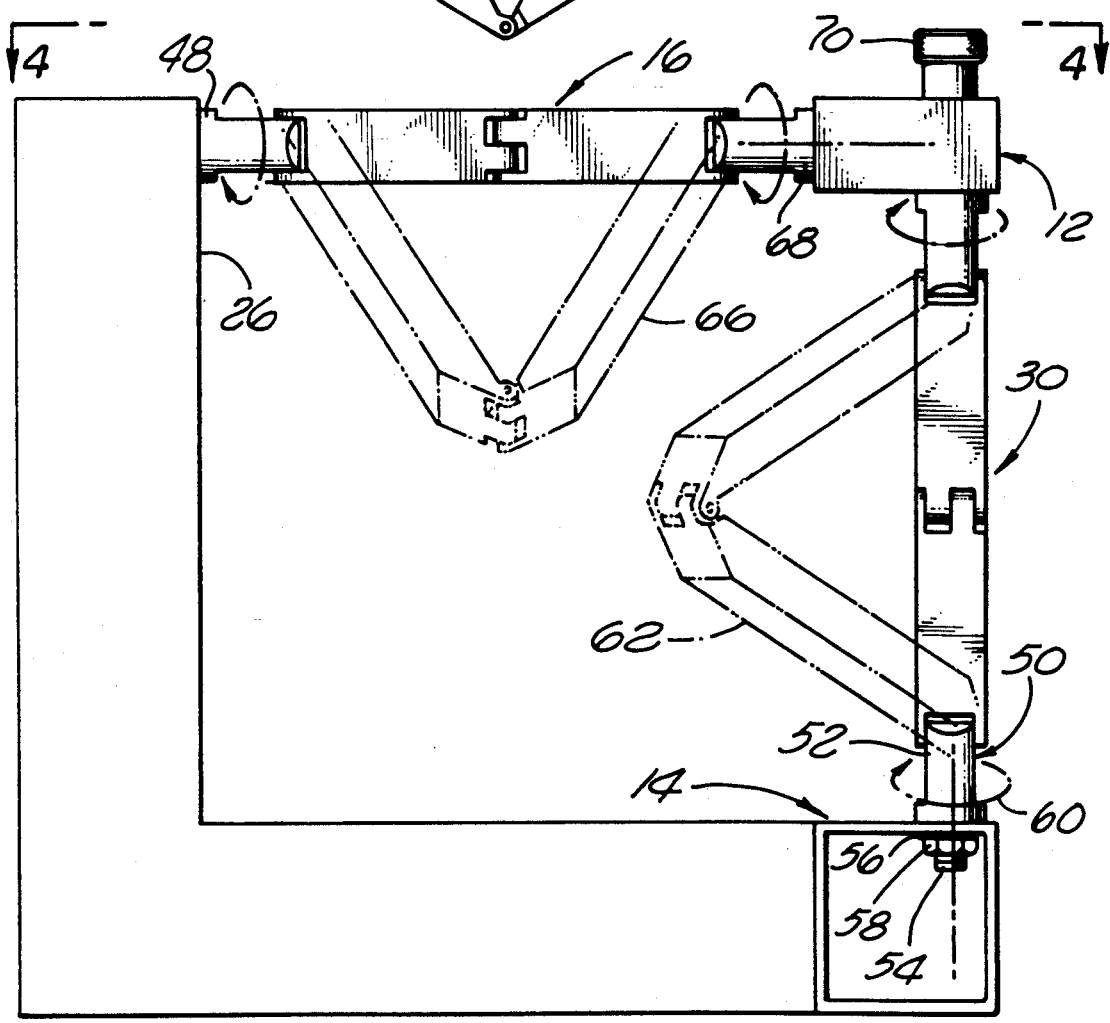
Fig. 3 is a side elevation view of the apparatus, shown along line 3—3 of FIG. 1.

As illustrated in FIG. 3, such a rotatable member may be, for example, a fitting 52 terminating in a stud 54 secured by a washer 56 and nut 58. Thus, the second arm assembly 30 may be rotated along arrow 60 to, for example, the fixed phantom position, designated 62, in FIG. 3. Rotation of the arm assembly 30 to this new position 62 will still provide straight line motion. However, the motion will be along a different straight line direction than that designated 46 in FIGS. 1 and 2. (It is emphasized that rotation of fitting 52 requires an identical rotation of a fitting 64 which is attached to the platform 12. As previously emphasized, each arm assembly is constrained to movement along its respective plane although that plane may rotate to result in the desired straight line direction.)

Similarly, the direction of the straight line may be further adjusted in a desired direction by rotation of the first arm assembly 16 to a desired angular position, as designated by phantom lines 66. Similar fittings 48, 68 may be used as in the second arm assembly 30. FIG. 4 illustrates these similar fitting related elements 54, 56, 58.

Referring now to FIG. 5, connection of fittings 64, 68 to the platform 12 are illustrated. A platform handle 70 serves as the nut for the stud 72 of the lower fitting 64. Fitting 64 attaches, by pin 75, to the second terminal end 76 of the second arm 36 of the second elbow assembly 30. Elbow assembly 30 is broken away to illustrate the elbow hinge 34, formed, in part, by pin 78.

FIG. 5 also illustrates a washer 56 and nut 58 threadably engaging a stud 54 of the fitting 68. A pin 80 is used to pivotally connect fitting 68 to arm 22.

Referring now to FIG. 6, as will be seen, the present invention may include remote actuation means for both changing the straight line direction and for providing platform translation. The static base 14 includes straight line direction rotary actuation means 82. Rotary actuation means 82 may be attached to platform translation rotary actuation means 84 which, in turn, connects to the elbow assembly 16. The straight line direction rotary actuation means 82 provides adjustments in the angular orientation of the elbow assembly 16, thereby providing adjustments in the direction of the straight line. The platform translation rotary actuation means 84, on the other hand, provides the desired changes in the distance between the first and second pivot points, 83,85, respectively, thus providing for platform translation.

The opposite end of elbow assembly 16 is attached to a clutch/brake 86 for preventing undesired rotation of the elbow assembly 16 thus assuring straight line direction. The second elbow assembly 30 includes a similar clutch/brake 88 and straight line direction rotary actuation means and platform translation rotary actuation means.

Phantom lines 12' indicate the platform positioned so that the clutch/brake 88 is aligned with the straight line direction rotary actuation means. At this position, changing the straight line direction is facilitated. Phantom line 12 show the platform repositioned along its straight line, but in the opposite direction, relative to position 12, required to reach position 12'. This further demonstrates the closed loop nature of the invention.

When the power is on for the straight line direction rotary actuation means 82, the clutch/brake 88 is off. When the power is off for the rotary actuation means 82 the clutch/brake 86 is on.

FIG. 7 illustrates a view along line 7—7 of FIG. 6. Inspection of both figures shows that actuator 84, which rotates arm 18 in the plane of the Figure, thereby contributing to platform travel in the same plane, is rotatable by actuator 82 about the latter's axial centerline 87, thus moving elbow assembly 16 out of the plane of FIG. 6 in order to change the direction of the straight line motion.

In the previous embodiments the principles of the present invention were illustrated with elbow assemblies to change the distance between the first and second pivot points and the third and fourth pivot points. It is understood that this aforementioned description of elbow assemblies was provided for the purposes of illustration and not limitation. In this regard, it is noted that other means may be provided for effecting changes in the distances between the aforementioned pivot points. It is emphasized, however, that the requirement remains the same that the arm assemblies must be constructed to be constrained to movement in a desired plane during the time in which straight line motion is desired.

Figure 8:
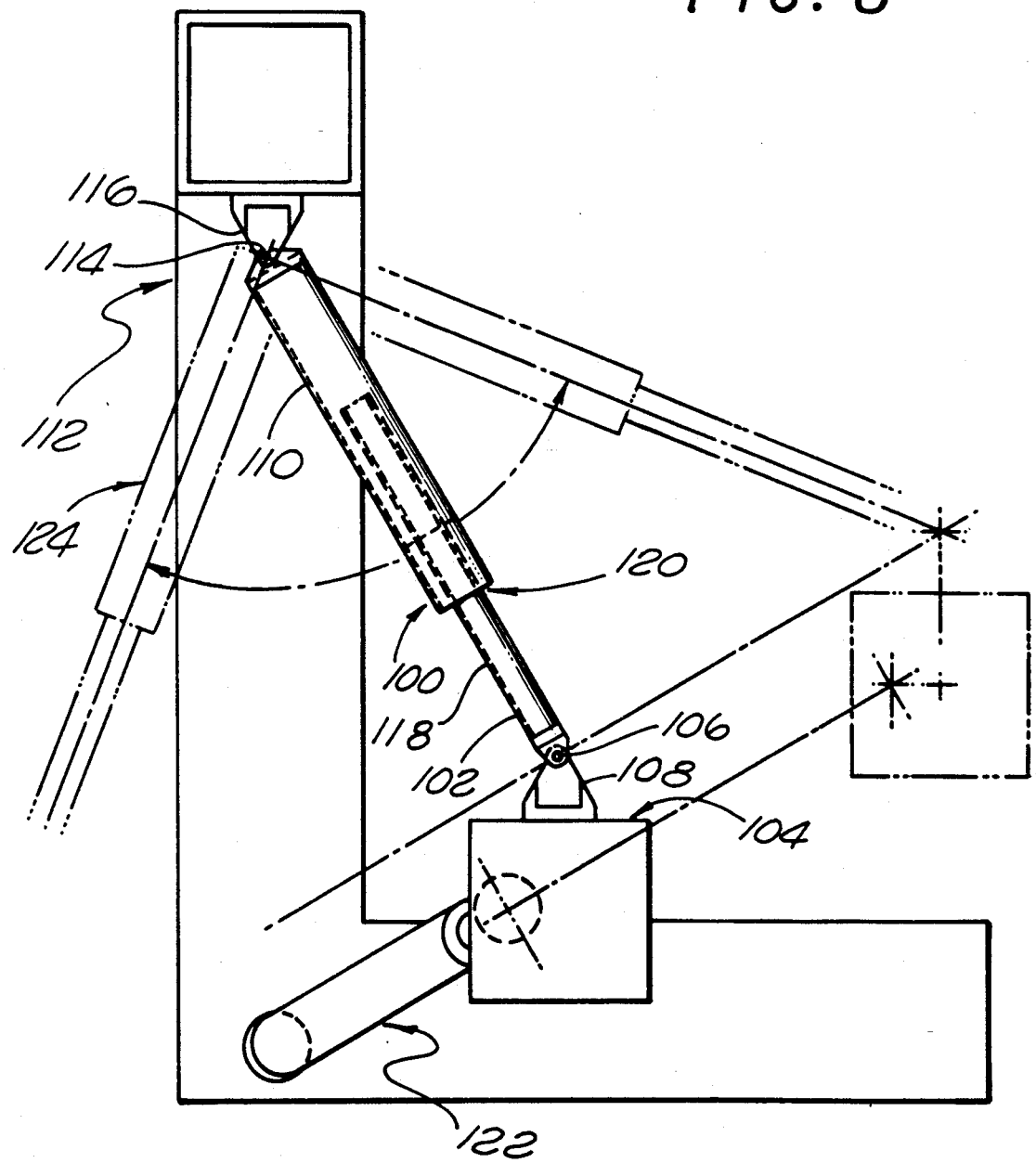
FIG. 8 illustrates the use of a telescoping tube assembly as an alternate to the elbow assemblies illustrated in the previous figures.

Referring now to FIG. 8, use of a telescoping tube assembly, designated generally as 100, is illustrated. A first tube 102 is connected to a platform 104 via a pivot 106 and fitting 108. The first tube 102 is telescopically engaged in a second tube 110. The second tube 110 is attached to the static base 112 via pivot 114 and fitting 116.

The first and second tubes 102, 110 are keyed against relative rotation by splines 118. A conventional antifriction recirculating ball spline assembly 120 is one of many well known methods that may be utilized.

Similarly, a second telescoping tube assembly 122 is connected at another portion of the base 112. Phantom lines 124, 126 illustrate various operating positions. Mechanical, or electronic remote control, can limit arm extension to safe limits, the former including stops internal to the telescoping arm, or at one or more of a number of possible points external to the arm assembly, thus providing to those skilled in the art, a choice of limiting the arm or the platform movement.

The telescoping tube embodiment illustrated in FIG. 8 is useful where volume is restricted. However, it substantially reduces available platform travel and increases cost.

There are literally thousands of applications which would derive benefits from the use of the present invention. Although it would be impossible to identify all such applications, a few of these possibilities will be described below in somewhat generic terms. The present invention may be utilized to replace sliding mechanisms, such as telescoping tubes; tracks and rollers; rods sliding in journal bearings; rotating screw assemblies including acme and recirculating ball types; X-Y plotters; and X-Y-Z mechanisms for positioning a tool, sensor, or workpiece anywhere within reach of the mechanism (the present invention providing all three motions in any desired direction of motion).

The present invention may provide sequencing for operations requiring multi-directional motions, such as packing and wrapping; or welding, drilling, cutting, or assembly operations on one or more sides of a fitting or assembly. The present invention may provide accurate guidance for rod, pin, or screw insertion; for can/bottle capping or filling machinery; or for other machinery requiring accurate straight line motion. (Note that a multidegree of freedom machine, such as a robot, may require all joint actuators to move in order to follow a straight line, thus compromising accuracy. The present invention is mechanically constrained to accurately trace the straight line for which it has been set, thus making it useful as a robot end effector.)

The present invention may be used to constrain car or truck wheels to move in a vertical plane, eliminating the lateral scrubbing now experienced with the double wishbone used in most expensive vehicles.

Obviously, many modifications and variations of the present invention are possible in light of the above teachings. It is therefore to be understood that, within the scope of the appended claims, the invention may be practiced otherwise than as specifically described.

For example, although in its broadest aspects, the elbow assembly embodiment of the present invention contains six links. Other redundant links may be provided for added strength/stiffness. However, when more than two sets of arms are employed, the planes in which all operate must intersect along lines that are parallel to each other. Furthermore, although the remote actuators have been described as being located at the static base, these actuators may be attached in a similar manner to the platform, or at the center (elbow) hinge of each arm assembly.

What is claimed and desired to be secured by Letters Patent of the United States is:

1. An apparatus for maintaining motion of a platform in a straight line comprising:
 a) static base;
 b) a platform;
 c) a first arm assembly having first terminal portion pivotally connected at a first pivot point to a first portion of said static base and a second terminal portion pivotally connected to said platform at a second pivot point, said first arm assembly being so constructed to permit changes in the distance between said first and second pivot points, but concomitantly being constrained to movement in a desired first plane; and d) a second arm assembly having a respective first terminal portion pivotally connected at a third pivot point to a second portion of said static base and a respective second terminal portion pivotally connected to said platform at a fourth point, said second arm assembly being so constructed to permit changes in the distance between said third and fourth pivot points, but concomitantly being constrained to movement in a desired second plane, which is angularly disposed from said first plane, the motion of said platform being constrained to a straight line when the distance between said first and second pivot points and/or the distance between said third and fourth pivot points is changed, said straight line having a direction parallel to an imaginary line defined by the intersection of said first and second planes, said static base including straight line direction rotary actuation means attached to both arm assemblies for providing adjustments in the angular orientation of the plane of said arm assembly, thereby providing adjustments in the direction of said straight line.

2. The apparatus of claim 1, wherein said first and second arm assemblies each comprise:
an elbow assembly comprising a first arm pivotally connected to a second arm.

3. The apparatus of claim 1, wherein said first and second arm assemblies each comprise:
a first tube telescopically engaged in a second tube, said first and second tubes being keyed against relative rotation therebetween.

4. The apparatus of claim 1, wherein said static base includes platform translation rotary actuation means attached to an arm assembly for providing the desired changes in the distance between said first and second pivot points and/or said third and fourth pivot points.

5. The apparatus of claim 1, wherein at least one of said arm assemblies further includes rotary actuation means attached thereto for providing the desired changes in the distance between said first and second pivot points and/or said third and fourth pivot points.

6. The apparatus of claim 1, wherein said straight line direction rotary actuation means comprises;
a) a fifth pivot point, adjacent to and between said static base and said first pivot point, the axis of said fifth pivot point being perpendicular to the axis of said first pivot point;
b) a sixth pivot point, adjacent to and between said platform and said second pivot point, the axis of said sixth point being perpendicular to the axis of said second pivot point;
c) a seventh pivot point, adjacent to and between said static base and said third pivot point, the axis of said seventh pivot point being perpendicular to the axis of said third pivot point; and
d) an eight pivot point, adjacent to and between said platform and said fourth pivot point, the axis of said eighth pivot point being perpendicular to the axis of said fourth pivot point.

7. An apparatus for maintaining motion of a platform in a straight line, comprising:
a) a static base;
b) a first elbow assembly comprising a first arm pivotally connected to a second arm, a first terminal portion of said first elbow assembly being pivotally connected to a first portion of said static base, said first elbow assembly being so constructed to be constructed to movement in a desired first plane;
c) a second elbow assembly comprising a first arm pivotally connected to a second arm, a first terminal portion of said second elbow assembly being pivotally connected to a second portion of said static base, said second elbow assembly being so constructed to be constructed to movement in a second plane which is angularly disposed from said first plane; and
d) a platform pivotally connected to second terminal portion of said first and second elbow assemblies, the motion of said platform being constrained to a straight line having a direction parallel to an imaginary line defined by the intersection of said first and second planes, said static base including straight line direction rotary actuation means attached to both elbow assemblies for providing adjustments in the angular orientation of the plane of said elbow assembly, thereby providing adjustments in the direction of said straight line.

8. The apparatus of claim 7, wherein said static base includes platform translation rotary actuation means attached to an elbow assembly for providing the desired changes in the distance between said first and second pivot points and/or said third and fourth pivot points.

9. The apparatus of claim 7, wherein at least one of said elbow assemblies further includes rotary actuation means attached thereto for providing the desired changes in the distance between said first and second pivot points and/or said third and fourth pivot points.

* * * * *